United States Patent [19]

Wilson

[11] Patent Number: 5,549,426
[45] Date of Patent: Aug. 27, 1996

[54] APPARATUS FOR FORMING SEVERAL POLYGONS TOGETHER

[75] Inventor: James M. Wilson, Glendora, Calif.

[73] Assignee: Xerox Corporation, Stamford, Conn.

[21] Appl. No.: 303,810

[22] Filed: Sep. 9, 1994

[51] Int. Cl.⁶ .................................................. B23B 5/00
[52] U.S. Cl. ................................................ 409/138; 82/18
[58] Field of Search ..................... 82/1.11,18; 409/132, 409/138, 174, 185, 199, 198, 200, 292, 293, 310, 311, 313

[56] References Cited

U.S. PATENT DOCUMENTS

| 4,982,496 | 1/1991 | Gaither et al. | 82/1.11 |
| 5,305,506 | 4/1994 | Forman | 409/198 |

FOREIGN PATENT DOCUMENTS

| 48178 | 4/1977 | Japan | 82/18 |
| 168401 | 7/1986 | Japan | 82/18 |
| 237802 | 10/1988 | Japan | 82/18 |
| 57502 | 3/1993 | Japan | 82/18 |
| 146901 | 6/1993 | Japan | 82/18 |
| 631260 | 11/1978 | U.S.S.R. | 82/18 |

*Primary Examiner*—Daniel W. Howell
*Attorney, Agent, or Firm*—Fariba Rad

[57] ABSTRACT

There is disclosed an apparatus for machining curved facets onto several polygons together. The apparatus of this invention comprises a fixture which has a mill bed and a ram. The mill bed holds an movable plate and the movable plate holds a rotating plate. The rotating plate which will be fixed during the operation of the apparatus will hold a stack of blank polygons. The ram holds two motors which are connected to a cutter. The motors cause the cutter to rotate and gradually move down the cutter. The rotation axis of the cutter is parallel to the rotation axis of the polygons. Once the motors are turned on the cutter will sequentially cut one curved facet onto each polygon. After one facet is cut onto each polygon, the motors will be stopped and the rotating plate will be rotated to position the polygons to receive the carve for the next curved facet.

1 Claim, 5 Drawing Sheets

FIG. 1 PRIOR ART
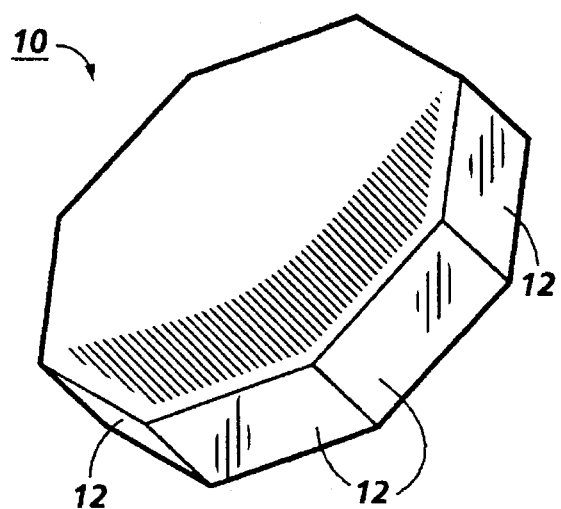
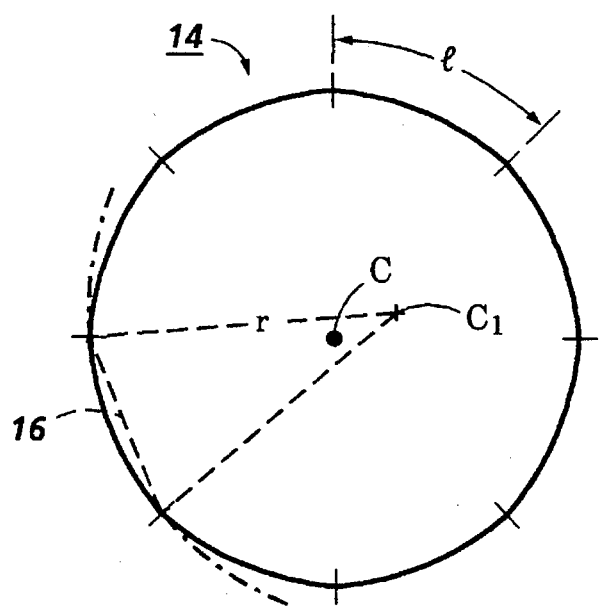
FIG. 2

APPARATUS FOR FORMING SEVERAL POLYGONS TOGETHER

BACKGROUND OF THE INVENTION

This invention relates to an apparatus which is capable of machining curved facets onto several blank polygons to be used in raster scanners.

Typically a raster scanner contains a light source, a collimator, pre-polygon optics, a multi-faceted rotating polygon as the scanning element, post-polygon optics and a photosensitive medium. The light source, which can be a laser source, produces a light beam and sends it to the rotating polygon through the collimator and the pre-polygon optics. The collimator collimates the light beam and the pre-polygon optics focuses the light beam in the sagittal or cross-scan plane onto the rotating polygon. The rotating polygon has a plurality of facets.

The facets of the rotating polygon reflect the light beam and also cause the reflected light revolve about an axis near the reflection point of the facet of the rotating polygon. This reflected light beam can be utilized through the post-polygon optics to scan a document at the input end of an imaging system as a raster input scanner or can be used to impinge upon a photosensitive medium, such as a xerographic drum (photoreceptor), in the output mode as a raster output scanner.

Referring to FIG. 1, there is shown a prior art polygon 10. Typically, the facets 12 of a rotating polygon 10 are flat surfaces. However, some raster scanners use a rotating polygon with curved facets.

Referring to FIG. 2, there is shown a top view of a polygon 14 which has curved facets 16. As it is shown, the center C1 of each curved facet is different than the center C of the polygon.

It is an object of this invention to provide an apparatus which is capable of machining curved facets onto several polygons together.

SUMMARY OF THE INVENTION

The present invention is directed to an apparatus for machining curved facets onto several polygons together. The apparatus of this invention has a fixture which has a mill bed and a ram. The mill bed holds a movable plate and the movable plate holds a rotating plate. The rotating plate is capable of holding several blank polygons. The ram holds two motors which are connected to a cutter. One motor rotates the cutter and the second motor gradually moves down the cutter. Once the motors are turned on, the cutter starts spinning and moving down. The cutter has a blade which cuts curved facets onto the blank polygons while the cutter spins. Since, the width of the blade is much shorter than the width of each facet, the cutter will gradually be lowered to cut the entire width of each facet. Once a facet is cut on each polygon, the cutter will be stopped and the rotatable plate will be rotated to position the polygons to receive the cut for the next facet. The distance between the cutter and the rotation axis of the cutter defines the radius of the facets.

BRIEF DESCRIPTION OF THE DRAWINGS

FIG. 1 shows a perspective view of a prior art polygon;

FIG. 2 shows a top view of a prior art polygon with curved facets;

DESCRIPTION OF THE PREFERRED EMBODIMENT

Figure 3:
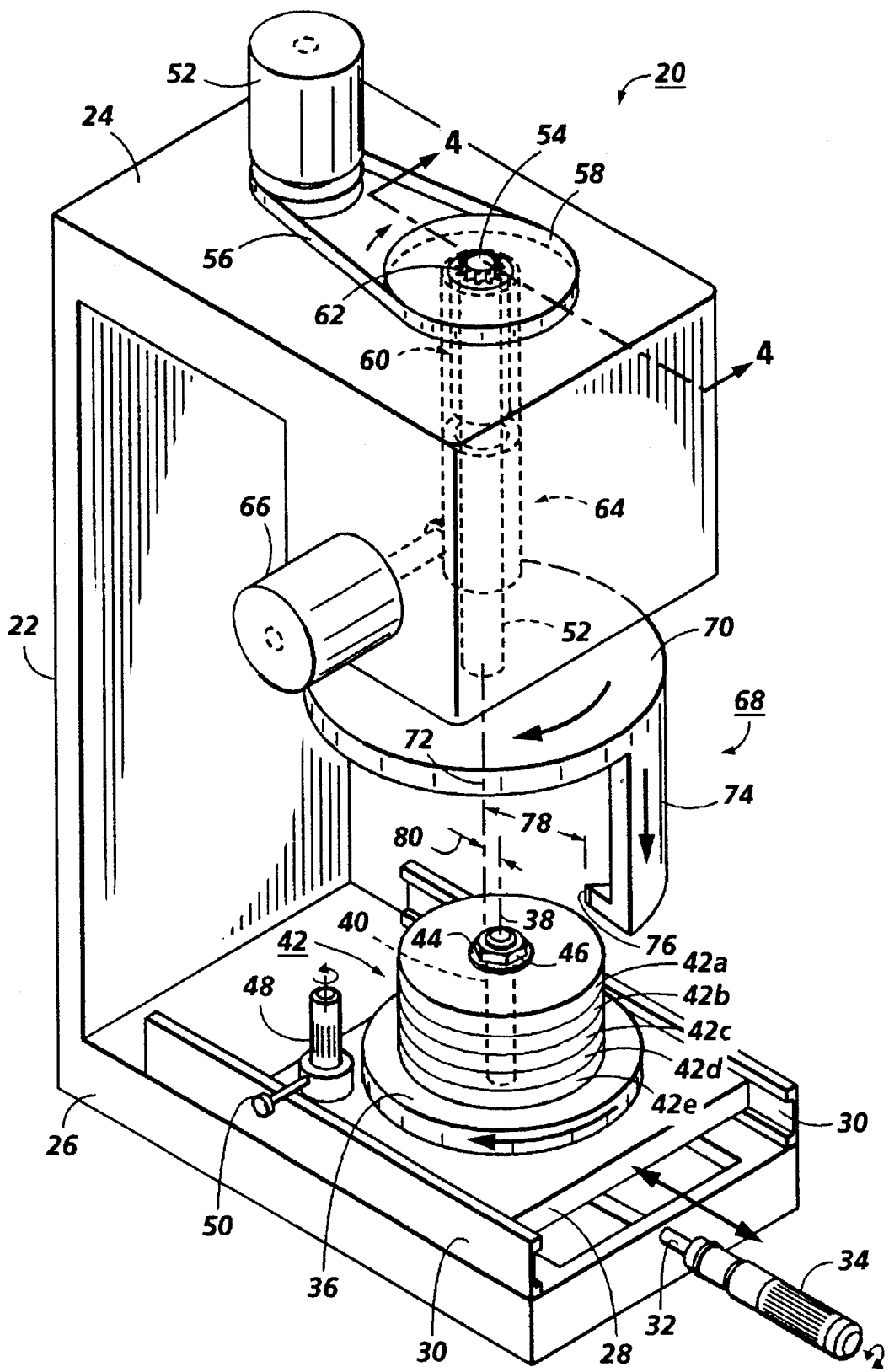
FIG. 3 shows a perspective view of a machine of this invention which is capable of machining curved facets onto several polygons together.

Referring to FIG. 3, there is shown a machine 20 which is capable of machining curved facets onto several polygons together. The machine 20 has a fixture 22. The fixture 22 has a ram 24 and mill bed 26. An x-axis plate 28 is movably mounted on mill bed 26. The x-axis plate 28 moves within the two railings 30. A shaft 32 which is connected to the x-axis plate 28 is also connected to a handle 34. By moving the handle 34 back and forth, the x-axis plate can be moved back and forth. Also, by rotating the handle 34 to a locked position, the shaft 32 and therefore the x-axis plate 28 can be fixed at a desired position.

A rotation stage 36 which can rotate along the rotation axis 38 is mounted on the x-axis plate 28. The rotation stage 36 has a shaft 40 along and coincident with the rotation axis 38 for receiving a stack 42 of polygons 42a, 42b, 42c, 42d and 42e. The stack 42 of the polygons will be fixed in place by a washer 44 and a nut 46 which will be screwed to the shaft 40. The rotation axis of the polygons is the same as the rotation axis of the rotation stage. A knob 48 is connected to the rotation stage 36 through normal gears (not shown) to provide a manual means for rotating the rotation stage 36. A lock 50 locks the knob 48 in order to fix the position of the rotation stage 36.

The ram 24 of the fixture 22 holds a motor 52. The motor is connected to a shaft 54 through a belt 56 and a pulley 58. As the motor 52 rotates, it also rotates the belt 56 and the pulley 58. The shaft 54 has partial splines 60 located in the vicinity of the pulley 58 and the pulley 58 has opposing splines 62 at its center which will engage to the splines 60 of the shaft 54. Therefore, as the pulley 58 rotates, it causes the shaft 54 to rotate as well.

Figure 4:
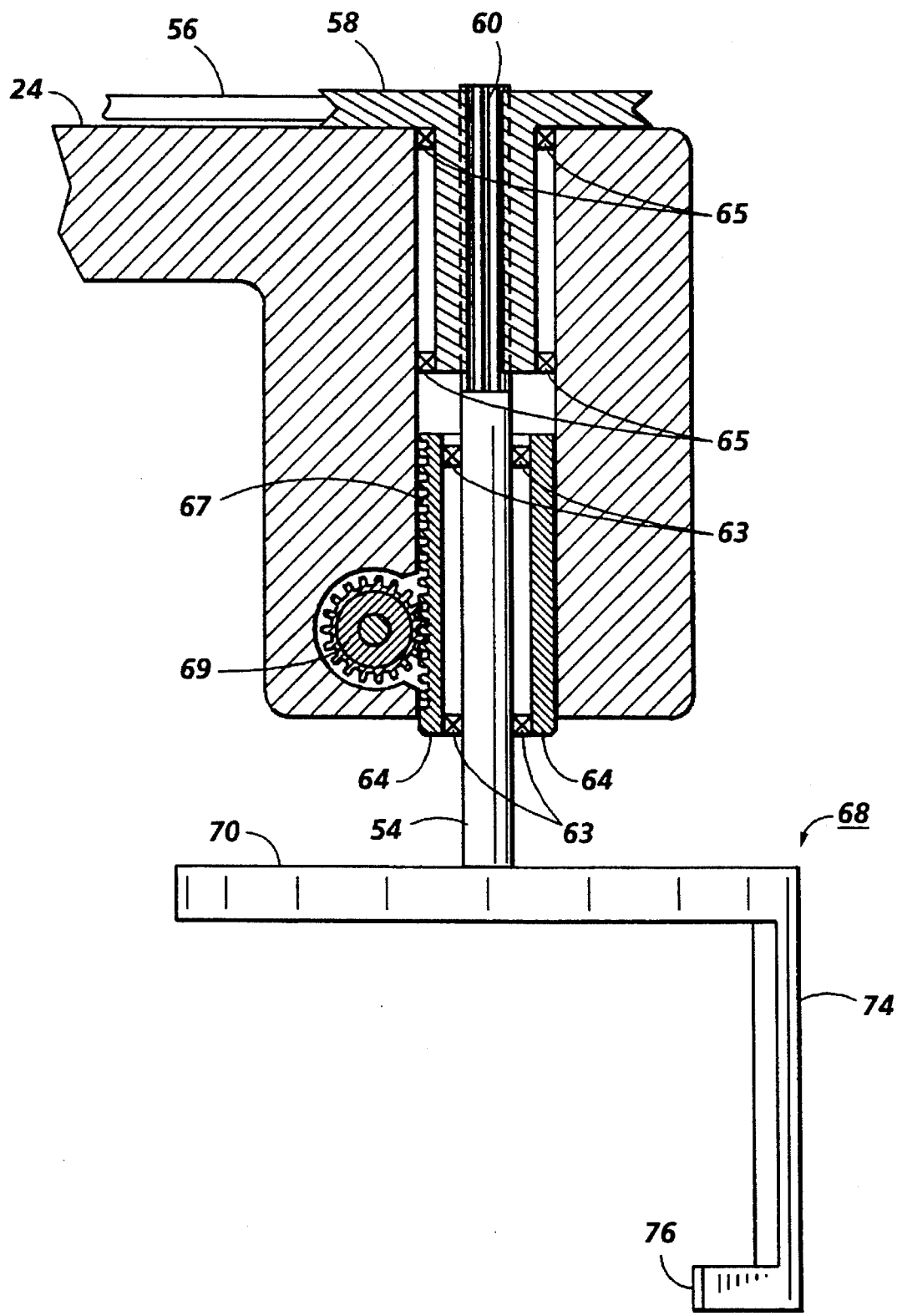
FIG. 4 shows a partial section view of the ram of FIG. 3 along line 4—4.

Referring to FIG. 4, there is shown a partial section view of the ram 24 of FIG. 3 along line 4—4. Referring to Both FIGS. 3 and 4, there is also a mill spindle 64 which is connected to the shaft 54 through normal bearings 63. There are also normal bearings 65 between the ram and the pulley 58. The mill spindle 64 has gear teeth 67. A motor 66 mounted onto the ram 24 in such a manner that the motor 66 is connected to the mill spindle 64 through a normal gear 69 which engage the gear teeth 67 of the mill spindle 64. As the motor 66 rotates, it moves the mill spindle 64 down and since the shaft 54 is connect to the mill spindle 64, through bearings 63, the shaft 54 will also move down. By reversing the rotational direction of the motor 66, the mill spindle 64 and therefore the shaft 54 will move up.

Referring back to FIG. 3, the shaft 54, which extends toward the mill bed 26, is attached to a cutter 68. The cutter 68 has a circular plate 70. Once the motor 52 is turned on, the circular plate 70 starts rotating. The rotation axis 72 of the circular plate 70 and the shaft 54 is parallel to the rotation axis 38 of the stack 42 of the polygons, but they do not coincide. The circular plate 70 has an arm 74 which is perpendicular to the circular plate 70 and extends toward the rotation stage 36. The arm 74 has a blade 76 which is perpendicular to the arm 74 and extends toward the rotation axis 38 of the polygons.

Since the blade 76 is attached to the circular plate 70 through the arm 74, it will rotate as the plate rotates and its rotation axis is the rotation axis 72 of the circular plate 70. The distance 78 between the blade 76 and the rotation axis 72 defines the radius r of the curved facet 16 (FIG. 2).

Also, by moving the x-axis stage 28, the distance 80 between the rotation axis 38 of the stack 42 of the polygons and the rotation axis 72 of the blade 76 can be adjusted. By changing the distance 80, the length I of each curved facet 16 (FIG. 2) will be changed. Therefore, in order to create facets with different lengths, the x-axis stage 28 has to be adjusted.

In operation, a stack 42 of blank polygon 42a, 42b, 42c, 42d and 42e will be placed on the rotation stage 36. The x-axis stage 28 will be adjusted for a desired length of the curved facet and then it will be fixed. Once the motor 52 and the motor 66 are turned on, the cutter 68 starts to spin and it gradually moves down. Therefore, the blade 76 starts cutting the blank polygons and it starts with the highest polygon 42a on the stack and gradually moves down to the last polygon 42e at the bottom of the stack.

Figure 5:
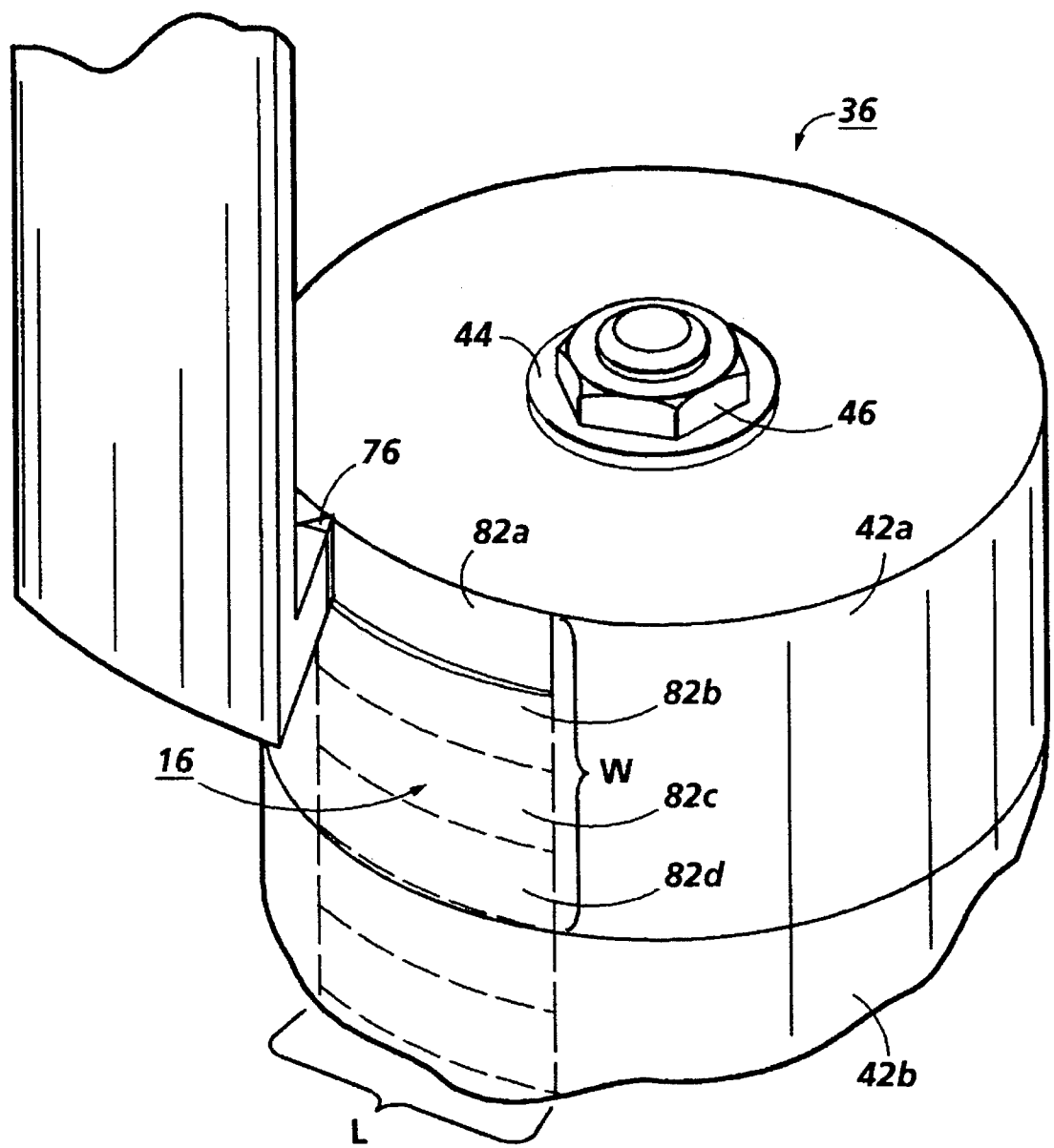
FIG. 5 shows a magnified portion of FIG. 3 showing the blade cutting a narrow path onto the facet.
Figure 6:
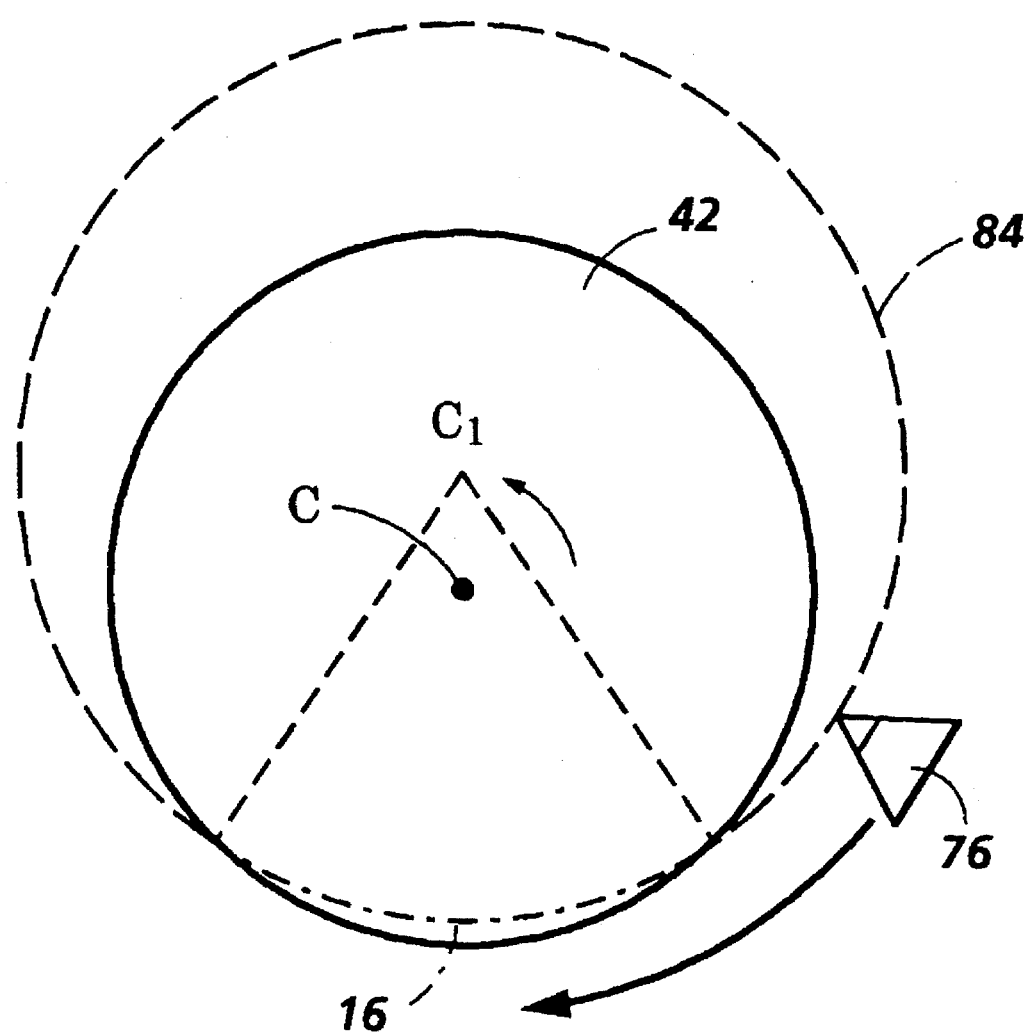
FIG. 6 shows a top view of a blank polygon and the circular path of the blade.

Referring to FIG. 5, there is shown blade 76, cutting a path 82a onto the blank polygon. Referring to FIG. 6, there is shown a top view of the blank polygon 42 and also there is shown the circular path 84 of the blade 76 which cuts a facet 16 onto the blank polygon 42. Referring back to FIG. 5, in the first revolution, the blade 76 cuts a narrow path 82a on the facet 16. Since, the width of the blade is much shorter than the width of each facet, the cutter will gradually be lowered to cut the entire width of each facet. Therefore, on the following revolution, the blade 76 will cut another narrow paths 82 adjacent to the previous path 82a. The two adjacent paths 82a and 82b partially overlap each other. In the same manner, on the following revolutions, the blade 76 cuts the paths 82c and 82d. The paths 82a, 82b, 82c and 82d cover the width w of one facet and therefore form a facet on the blank polygon.

Referring back to FIG. 3, in the same manner, the cutter moves down to the next polygon to carve one facet onto the following polygon 42b and finally it moves down to the bottom polygon 42e.

Referring back to FIG. 3, Once one facet is cut onto each blank polygon, the x-axis stage 28 will be moved in order to move the polygon stack away from the blade 64 and the blade 64 will be raised to the initial position to be ready to start cutting a different facet onto the highest polygon on the stack. Then the rotation stage 36 will be rotated based on a pre-determined angle of rotation to position the blank polygons to receive the cut for the next facet. After the rotation stage 36 is rotated, the x-axis stage 28 will be moved in order to move the polygon stack to engage the blade 64.

In the same manner, after cutting one facet onto all the polygons is completed, the x-axis stage 28 will be moved in order to move the polygon stack 42 away from the blade 64 and the rotation stage will be rotated and fixed and then the x-axis stage 28 will be moved in order to move the polygon stack 42 to engage the blade 64. This procedure will be repeated until all the facets on each polygon are cut.

In order to modify the radius of the curved facet for different raster scanning systems, the distance 78 between the blade 74 and its rotation axis of 72 should be adjustable.

The cutter 68 can have various mechanisms in order to modify the distance 78 between the blade 76 and the axis of rotation 72. For example, the blade 76 can be adjustably attached to the arm 74 in which an adjusting means will move the cutter back and forth. As another example, the cutter can be replaceable. In this case the cutter will have a different thickness. The difference in the thickness of the cutters will cause the distance 78 between the blade 76 and the rotation axis 72 to change. Therefore, for a given radius of curved facet, a cutter with a certain thickness will be assigned.

What is claimed is:

1. An apparatus for machining curved facets comprising:

a fixture;

a cutter rotatably mounted on said fixture for rotating about a first given axis;

means for rotating and gradually moving said cutter in a direction generally parallel to the first given axis during a cutting operation;

a first plate;

means for movably mounting said first plate onto said fixture for a movement in a direction generally perpendicular to the first given axis into and out of a cut operating position;

means for fixing said first plate in a cut operating position;

a second plate;

means for rotatably mounting said second plate onto said first plate for rotating about a second given axis;

said second given axis being generally parallel to the first given axis;

said second plate having a means for holding blank members on said second plate in such a manner that the center of the blank members coincide with the second given axis;

means for fixing said second plate in a cut operating position; and said first plate and second plate are being so constructed and arranged that when in their respective cut operating position, a peripheral portion of the blank member being held by said second plate will be cut by said cutter during its cutting operation.

\* \* \* \* \*